United States Patent
Greggs (10) Patent No.: US 10,315,603 B2
(45) Date of Patent: Jun. 11, 2019

(54) VEHICLE FOOTREST IMPACT DEFLECTION MEMBER

(71) Applicant: Nissan North America, Inc., Franklin, TN (US)

(72) Inventor: Alan Greggs, Canton, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 15/718,230

(22) Filed: Sep. 28, 2017

(65) Prior Publication Data

US 2019/0092260 A1    Mar. 28, 2019

(51) Int. Cl.
*B60R 21/055*    (2006.01)
*B60N 3/06*    (2006.01)
*B60R 13/02*    (2006.01)
*B62D 25/04*    (2006.01)

(52) U.S. Cl.
CPC .............. *B60R 21/055* (2013.01); *B60N 3/06* (2013.01); *B60R 13/025* (2013.01); *B62D 25/04* (2013.01)

(58) Field of Classification Search
CPC .......... B60N 3/06; B60N 3/066; B60R 21/055
USPC .......................................................... 296/75
See application file for complete search history.

(56) References Cited

U.S. PATENT DOCUMENTS

| 6,283,529 | B2 | 9/2001 | Kitagawa | |
|---|---|---|---|---|
| 6,318,785 | B1 * | 11/2001 | Tousignant | .......... B60N 2/0228 296/75 |
| 7,246,837 | B2 | 7/2007 | Dendo et al. | |
| 8,714,620 | B1 * | 5/2014 | Meszaros | ................. B60N 3/06 296/39.1 |
| 8,939,496 | B2 | 1/2015 | Obayashi et al. | |
| 9,045,059 | B1 | 6/2015 | Davies et al. | |
| 9,539,973 | B2 * | 1/2017 | Kawano | .................. B60R 21/04 |
| 2007/0080562 | A1 | 4/2007 | Taniguchi et al. | |
| 2014/0292017 | A1 | 10/2014 | Bouillon et al. | |
| 2015/0165951 | A1 * | 6/2015 | Bouillon | ................ B60N 3/066 296/187.08 |
| 2017/0158105 | A1 * | 6/2017 | Toniolo | .................... B60N 3/06 |

FOREIGN PATENT DOCUMENTS

| EP | 1750975 B1 | 3/2008 |
|---|---|---|
| EP | 1789282 B1 | 6/2008 |
| JP | 2010-116152 A | 5/2010 |
| JP | 2014-231336 A | 12/2014 |

* cited by examiner

*Primary Examiner* — Dennis H Pedder
(74) *Attorney, Agent, or Firm* — Global IP Counselors, LLP (57) ABSTRACT

A vehicle footrest impact deflection member includes a first portion and a second portion. The first portion is configured to be disposed outboard of a vehicle trim panel. The first portion includes a non-collapsible part having a first overall density. The second portion extends inboard from the first portion. The second portion includes a collapsible part having a second overall density that is less dense than the first overall density of the non-collapsible part.

15 Claims, 8 Drawing Sheets

VEHICLE FOOTREST IMPACT DEFLECTION MEMBER

BACKGROUND

Field of the Invention

The present invention generally relates to a vehicle footrest impact deflection member. More specifically, the present invention relates to a partly collapsible vehicle footrest impact deflection member that deflects the driver's left foot away from the impact during an off-center impact test.

Background Information

It has been known that drivers of vehicles, especially heavy-duty vehicles, are subject to excessive fatigue of the back and legs following prolonged periods of driving. This is particularly true of the left leg. Further, on vehicles equipped with a clutch pedal, the driver is prone to rest his left foot on the clutch pedal. This results in "riding the clutch", with resultant excessive clutch wear. Therefore, it is desirable to provide a footrest in a vehicle footrest area for the driver's foot. Conventional footrests include a footrest plate that is typically constructed of metal or foam. These footrests typically provide support for the drivers left foot and can provide some impact absorption during an impact.

SUMMARY

It has been discovered that during certain off-center impact tests, the driver's foot or leg may be receive an input load as a result of the impact.

In view of the state of the known technology, one aspect of the present disclosure is to provide a vehicle footrest impact deflection member comprising a first portion and a second portion. The first portion is configured to be disposed outboard of a vehicle trim panel. The first portion includes a non-collapsible part having a first overall density. The second portion extends inboard from the first portion. The second portion includes a collapsible part having a second overall density that is less dense than the first overall density of the non-collapsible part.

In view of the state of the known technology, a second aspect of the present disclosure is to provide a vehicle structure comprising a vehicle body panel and a vehicle footrest impact deflection member. The vehicle footrest impact deflection member is disposed over the vehicle body panel. The vehicle footrest impact deflection member includes a first portion having first overall density and a second portion having a second overall density. The second overall density is less than the first overall density. The second portion is disposed inboard of the first portion.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
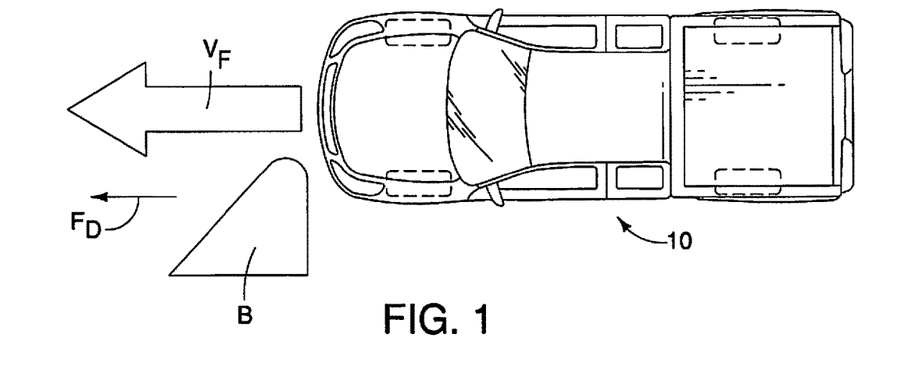
FIG. 1 is a schematic view of a conventional moving vehicle showing its response to a small overlap test where a front corner of the vehicle is aligned with a fixed, rigid barrier for eventual impact with the barrier.
Figure 2:
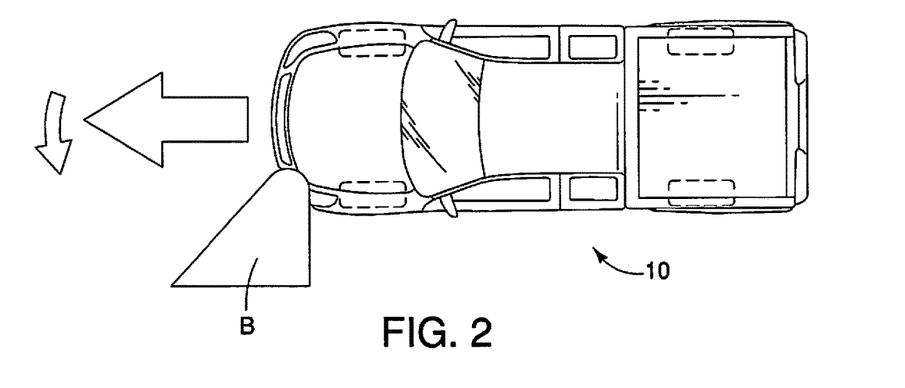
FIG. 2 is another schematic view of the conventional vehicle showing its response to the small overlap test at the beginning of an impact event with the front corner of the conventional vehicle impacting the barrier and beginning to undergo deformation.
Figure 3:
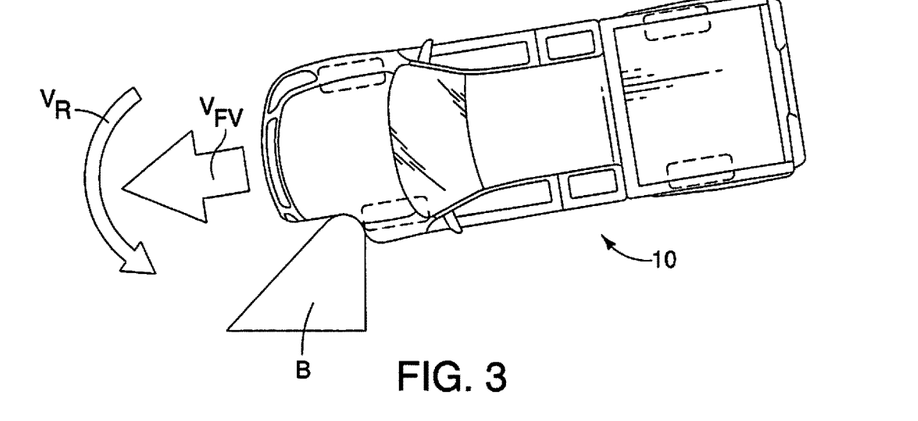
FIG. 3 is still another schematic view of the conventional vehicle showing its response to the small overlap test with the conventional vehicle undergoing further deformation during the impact event.

Referring initially to FIG. 1, an off-center impact test is illustrated in which a conventional vehicle 10 is approaching a rigid barrier B at a forward traveling velocity $V_F$. FIG. 2 shows the conventional vehicle 10 just after initial impact with the rigid barrier B showing initial deformation and forward momentum being transformed into rotational displacement about the rigid barrier B. FIG. 3 shows the conventional vehicle 10 undergoing further deformation and rotation as a result of the impact event. Upon contact of the vehicle 10 with the rigid barrier B, the rapid deceleration of the vehicle 10 from the impact causes the forward traveling velocity $V_F$ to be reduced to $V_{FV}$ and the vehicle 10 swerves in a velocity $V_R$.

Figure 4:
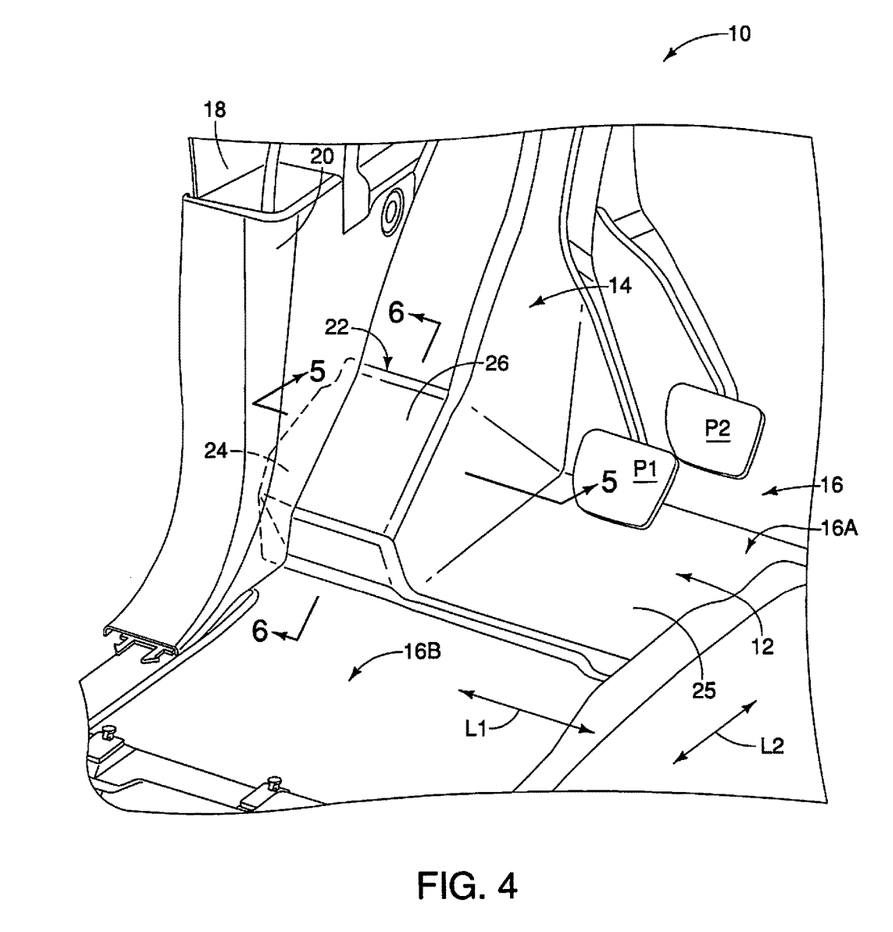
FIG. 4 is a perspective view of a vehicle footrest area having a vehicle structure including a vehicle impact deflection member in accordance with one illustrative embodiment.

Referring now to FIG. 4, a portion of the vehicle 10 is illustrated in accordance with an illustrated embodiment. Here, the vehicle 10 is a unibody vehicle. In particular, the vehicle 10 includes a vehicle footrest area 12, which corresponds to a driver's footrest area. The footrest area 12 of the vehicle 10 is defined by a vehicle structure 14 in accordance with the illustrated embodiment. The vehicle 10 also has a pair of vehicle pedals P1 and P2 that extends into the footrest area 12. In particular, the vehicle pedal P1 is a brake pedal and the vehicle pedal P2 is a clutch pedal, which is shown in the depressed position for the sake of illustration. In the illustrated embodiment, the vehicle structure 14 comprises a vehicle body panel 16. The vehicle body panel 16 is part of a unibody or unitized body of the vehicle 10. The vehicle body panel 16 includes a dash panel 16A and a floor panel 16B. In some areas, the dash panel 16A is reinforced with a dash panel reinforcement 16C but these two parts serve the same structural purpose. The dash panel 16A and the floor panel 16B are rigidly connected together in a conventional manner. The dash panel 16A has a longitudinal length that extends laterally in a vehicle widthwise direction L1. The dash panel 16A separates a vehicle interior (e.g., a passenger compartment) from an engine compartment (not shown) in a conventional manner. The dash panel 16A is constructed of any suitable rigid material such as a metallic material (e.g., steel). The dash panel 16A can include reinforced portions constructed of thicker or higher strength steel, as needed and/or desired.

In the illustrated embodiment, the floor panel 16B extends rearwardly of the dash panel 16A, and forms a horizontal plane of the vehicle 10. In the illustrated embodiment, the floor panel 16B is an example of a front floor panel. The floor panel 16B is part of an underbody structure of the vehicle 10, and extends underneath a vehicle seat (not shown). The floor panel 16B is also constructed of any suitable rigid material such as a metallic material (e.g., steel). The floor panel 16B is generally flat, while the dash panel 16A is contoured. The dash panel 16A is inclined upwardly and forwardly from a forward end of the floor panel 16B.

The vehicle structure 14 further comprises a vehicle pillar 18. In particular, in the illustrated embodiment, the vehicle pillar 18 is a portion of an A-pillar of the vehicle 10. Here, the vehicle pillar 18 connects the dash panel 16A and a roof portion (not shown) of the vehicle 10. The vehicle pillar 18 is formed, molded, cut and/or stamped using a plurality sheet metal panels that are welded or otherwise fixed together, to define various inboard and outboard shapes and surfaces of the vehicle 10. In any case, the vehicle pillar 18 is also constructed of any suitable rigid material such as a metallic material (e.g., steel).

The vehicle structure 14 further comprises a vehicle trim panel 20 that is disposed over the vehicle pillar 18. In the illustrated embodiment, the trim panel 20 is an interior covering for the vehicle pillar 18. The trim panel 20 is connected to the vehicle pillar 18 in a conventional manner. For example, the trim panel 20 can be connected to the vehicle pillar 18 via an interlocking arrangement or can be clipped to the vehicle pillar 18. The vehicle trim panel 20 can be made of any of a variety of materials, such as plastic or polymer materials, composite materials, wood veneer, or any appropriate material that complements and/or blends in with the decorative design of the vehicle 10.

The vehicle structure 14 further includes a vehicle footrest impact deflection member 22 (hereinafter "the impact deflection member 22"). The impact deflection member 22 is disposed over the vehicle body panel 16 interiorly, as further discussed below. As shown, the impact deflection member 22 is disposed on the dash panel 16A in a position that is outboard of the pedals P1 and P2. In the illustrated embodiment, the impact deflection member 22 forms a vehicle footrest of the vehicle 10 that is configured to support a driver's foot.

As seen in FIGS. 2 and 3, the vehicle structure 14 further includes a dash insulator 23 and a carpet 25 that are disposed over the impact deflection member 22. The dash insulator 23 preferably includes a resin layer of air impermeability and a sound absorption layer. The dash insulator 23 is preferably formed by a thermoplastic soundproof material with predetermined basis weight. As shown, the dash insulator 23 is disposed over the dash panel 16A and the impact deflection member 22. The carpet 25 is disposed over the dash insulator 23 and the floor panel 16B in a conventional manner. The dash insulator 23 and the carpet 25 are conventional, and will therefore not be further discussed herein. Thus, the vehicle body panel 16 supports the impact deflection member 22, the vehicle trim panel 20, the dash insulator 23 and the carpet 25.

Typically, during the off-center impact test illustrated in FIGS. 1 to 3, impact with the barrier B causes deformation of a fender area, rotation of the tire in the rearward direction, and deformation of the vehicle body panel 16 and vehicle pillar 18. As a result of the impact, the driver's left foot may receive a load. In the illustrated embodiment, the impact deflection member 22 is provided and is configured to collapse in a controlled manner. The outboard portion of the impact deflection member 22 remains somewhat ridged and the inboard portion of the impact deflection member 22 collapses. Thus, the impact deflection member 22 is configured to guide the driver's foot in the vehicle inboard direction (i.e., toward an accelerator pedal) upon collapsing of the inboard portion of the impact deflection member 22, as diagrammatically seen in FIGS. 8 and 9. The actual shape of the impact deflection member 22 after collapsing will vary depending on the vehicle structure supporting the impact deflection member 22 and the force received during the off-center impact test.

Referring now to FIGS. 5 to 10, the impact deflection member 22 will now be discussed in greater detail. The impact deflection member 22 comprises a first portion 24 and a second portion 26. In the illustrated embodiment, the line of demarcation between the first portion 24 and the second portion 26 (illustrated by the dashed line in FIGS. 7 and 8) corresponds to a lower edge of the vehicle trim panel 20. As explained below, the second portion 26 is configured to at least partially collapse while the first portion 24 does not substantially collapse. In this way, the collapsing of the second portion 26 guides the driver's foot away from the vehicle trim panel 20 during the vehicle off-center impact test. The first portion 24 has a first overall density and the second portion 26 has a second overall density that is less than the first overall density. As shown, the second portion 26 is disposed inboard of the first portion 24. As will be further discussed below, the second portion 26 is configured to collapse in a controlled manner during a vehicle off-center impact test while the first portion 24 is configured to substantially maintain its overall dimension and configuration during the vehicle off-center impact test.

As best seen in FIGS. 1 and 2, the vehicle trim panel 20 is disposed over the first portion 24 of the vehicle footrest impact deflection member 22 having the first overall density, as will be further discussed below. In the illustrated embodiment, the first and second portions 24 and 26 are a one-piece integral member. The first and second portions 24 and 26 are constructed of an appropriate energy absorbing or vibration damping material, such as foam, rubber or other polymers. For example, in the illustrated embodiment, the first and second portions 24 and 26 are made of foam. More preferably, the first and second portions 24 and 26 are constructed of a polystyrene and polyethylene blend. It will be apparent to those skilled in the vehicle field from this disclosure that the first and second portions 24 and 26 can be constructed of different types of foam having different properties and densities so that the second overall density of the second portion 26 is less than the first overall density, as needed and/or desired. Here, the material of the impact deflection member 22 is permanently deformed or crushed upon receiving a predetermined impact load. In the illustrated embodiment, a predetermined impact load for the second portion 26 of the impact deflection member 22 is preferably at least 380 Newtons. In other words, the collapsible part 26a can preferably withstand at least 380 Newtons before experiencing deformation. In the illustrated embodiment, the predetermined impact load is preferably approximately 390 Newtons.

Figure 7:
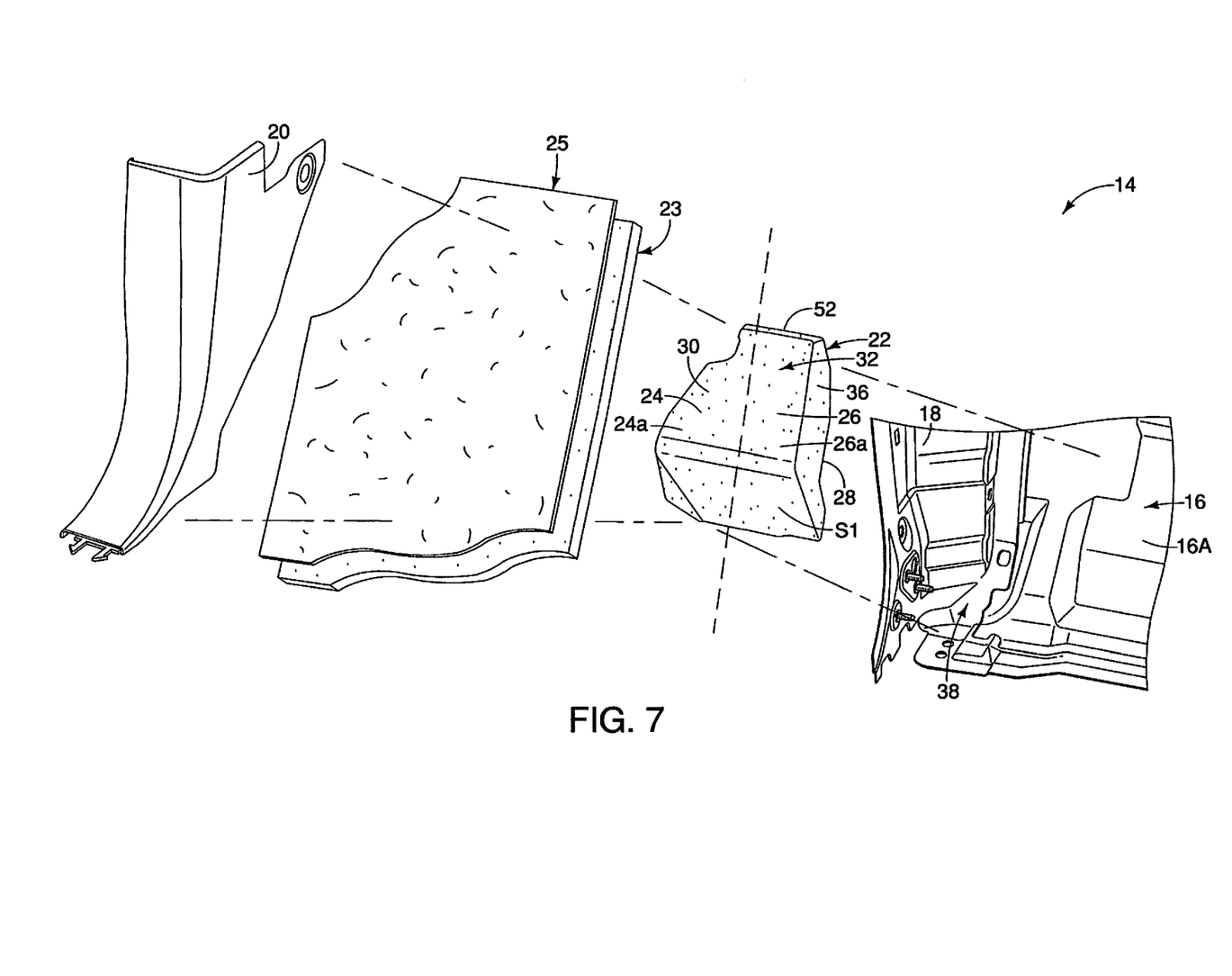
FIG. 7 is an exploded view of a portion of the vehicle structure illustrated FIGS. 4 to 6.
Figure 8:
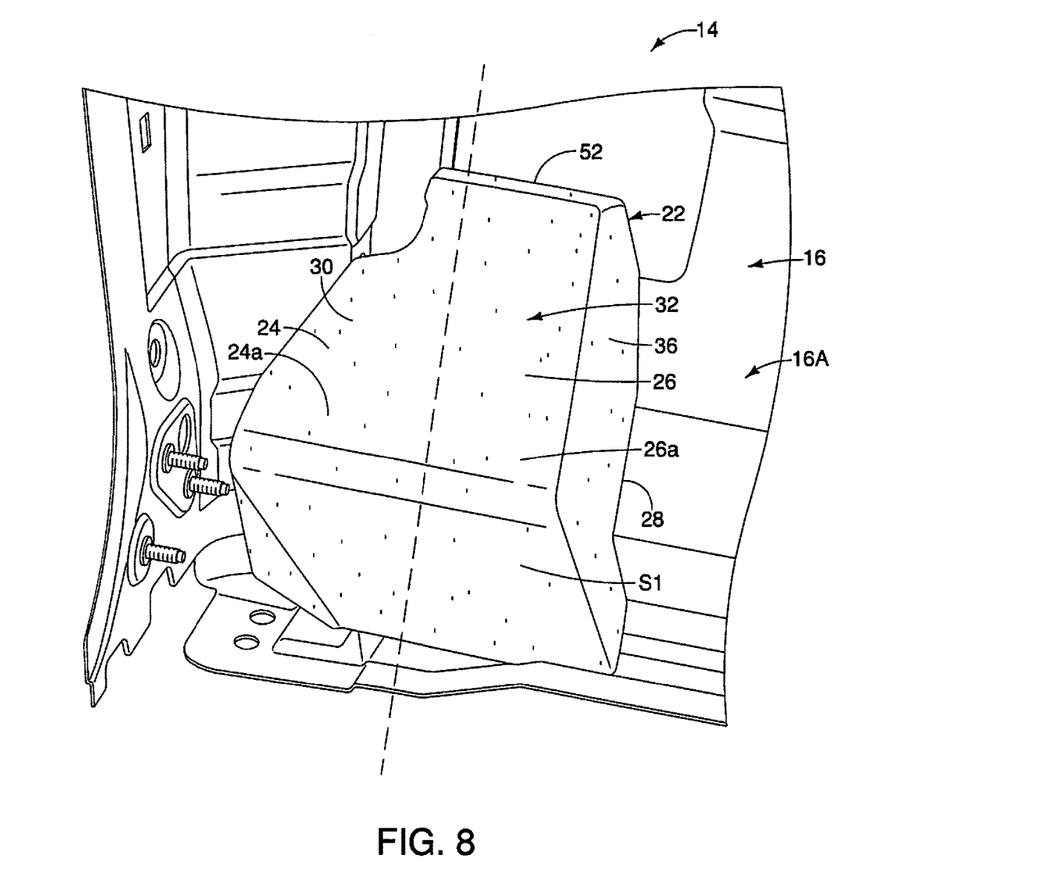
FIG. 8 is a perspective view of a portion of the vehicle structure illustrated FIGS. 4 to 6 having the vehicle impact deflection member shown in a non-collapsed state.
Figure 9:
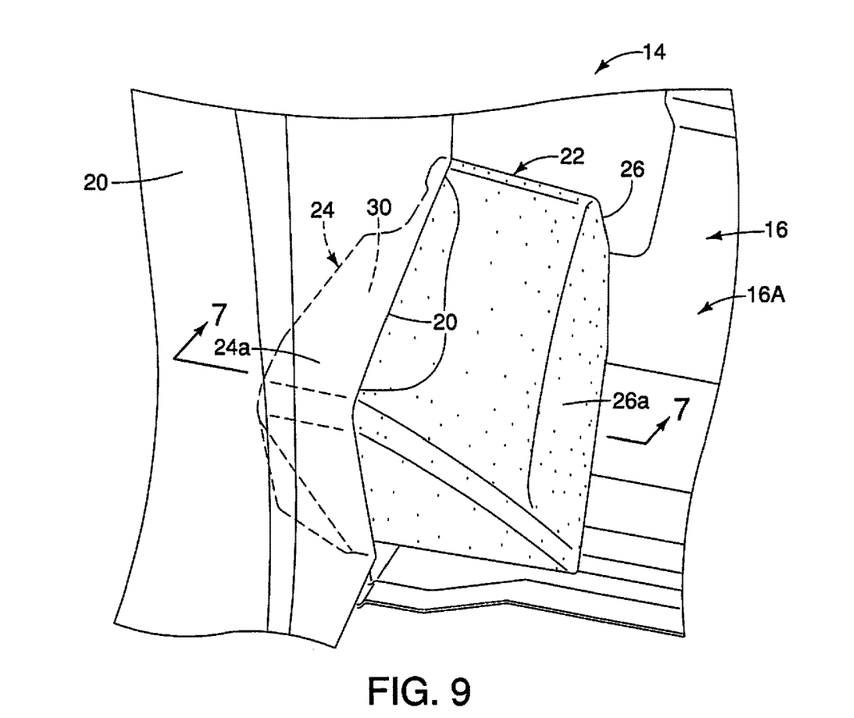
FIG. 9 is a perspective view of the portion of the vehicle structure illustrated FIG. 8 having the vehicle impact deflection member diagrammatically shown in a collapsed state.
Figure 10:
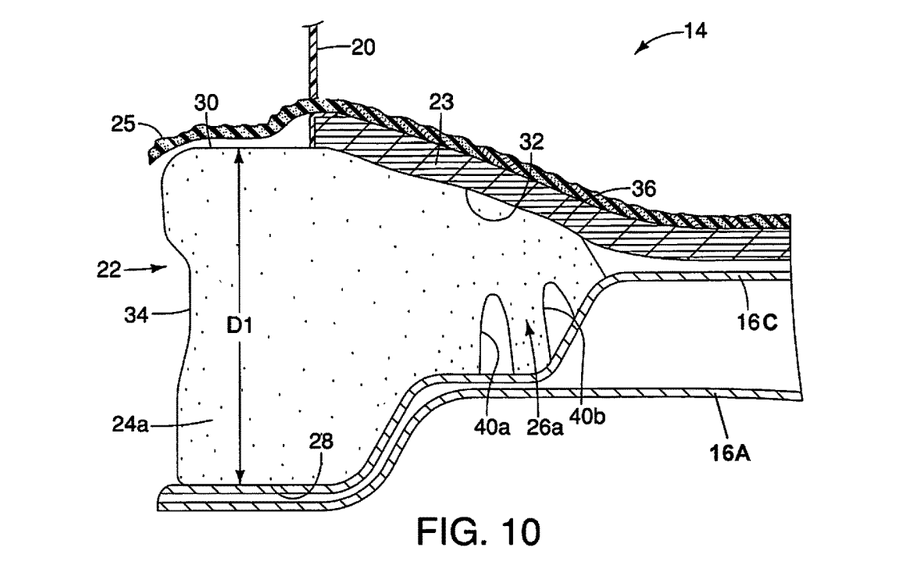
FIG. 10 is a cross-sectional view of a portion of the vehicle structure as seen along section line 10-10 of FIG. 9.

Referring now to FIGS. 8 to 10, the impact deflection member 22 includes a plurality of surfaces. In particular, the impact deflection member 22 includes, amongst others, a vehicle body panel facing surface 28, a vehicle trim panel facing surface 30, a footrest surface 32, an outboard facing surface 34 and an inboard facing surface 36. The outboard facing surface 34 connects the vehicle body panel facing surface 28 and the vehicle trim panel facing surface 30. The inboard facing surface 36 connects the vehicle body panel facing surface 28 and the footrest surface 32. As shown in FIGS. 4 and 8, the inboard facing surface 36 is outboard of the pedals P1 and P2. Thus, the impact deflection member 22 is disposed outboard of the pedals P1 and P2 when installed. In addition, as seen in FIGS. 7 and 8, the outboard facing surface 34 contacts vehicle pillar 18 when installed.

The vehicle body panel facing surface 28 faces the vehicle body panel 16 when the impact deflection member 22 is installed in the vehicle 10. In the illustrated embodiment, the vehicle body panel facing surface 28 has a shape that corresponds to a surface of the dash panel 16A. It will be apparent to those skilled in the vehicle manufacturing field from this disclosure that the vehicle body panel facing surface 28 can have a variety of geometric shapes and configurations that correspond to a variety of shapes and configurations of a vehicle dash panel, as needed and or desired.

As shown, the vehicle trim panel facing surface 30 and the footrest surface 32 are disposed opposite of the vehicle body panel facing surface 28. In the illustrated embodiment, the vehicle trim panel facing surface 30 is configured to face the trim panel 20. In other words, the trim panel 20 is disposed over the vehicle trim panel facing surface 30 when the trim panel 20 is installed in a conventional manner. The vehicle trim panel facing surface 30 is disposed outboard of the footrest surface 32. As shown, the vehicle trim panel facing surface 30 is coplanar with the footrest surface 32. In particular, the footrest surface 32 extends inboard from the vehicle trim panel facing surface 30 on the same plane. The vehicle footrest surface 32 is configured to support the driver's foot. As seen in FIG. 4, the vehicle footrest surface 32 and the vehicle body panel facing surface 28 are raised surfaces with respect to the floor panel 16B when the impact deflection member 22 is installed.

Figure 11:
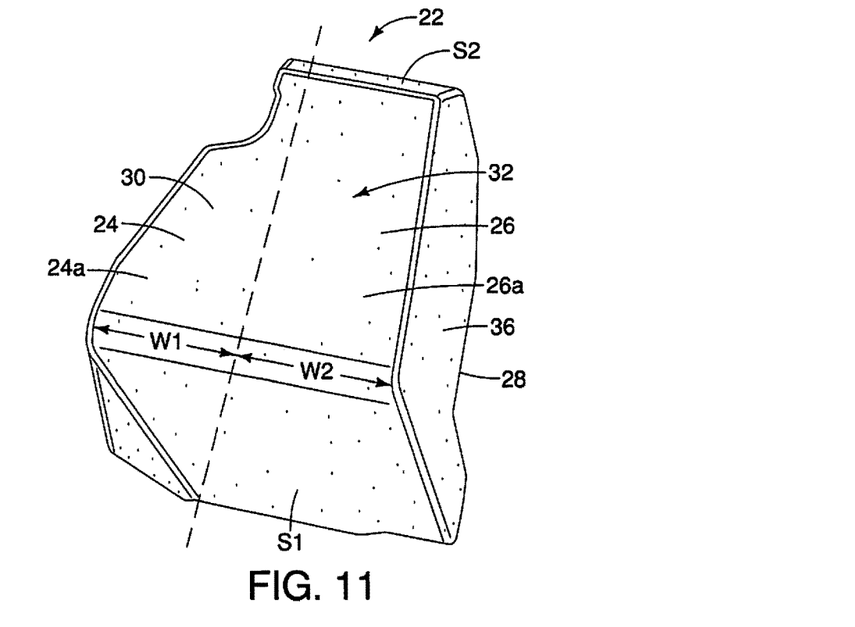
FIG. 11 is a first perspective view of the vehicle impact deflection member illustrated FIGS. 4 to 7 showing interior faces surfaces of the vehicle impact deflection member.

In the illustrated embodiment, as best seen in FIG. 11, the vehicle trim panel facing surface 30 has a maximum dimension W1 as measured in the vehicle widthwise (lateral) direction L1. Similarly, the footrest surface 32 has a maximum dimension W2 as measured the vehicle widthwise direction L1. In the illustrated embodiment, the maximum dimension W1 of the vehicle trim panel facing surface 30 comprises approximately 30 percent to 50 percent of the total width of the impact deflection member 22 as measured in the vehicle widthwise direction L1. That is, approximately 30 to 50 percent of the impact deflection member 22 is disposed outboard of the trim panel 20 to achieve a secure fit of the impact deflection member 22. In the illustrated embodiment, the maximum dimension W1 of the vehicle trim panel facing surface 30 has the same the maximum dimension W2 of the footrest surface. In other words, preferably, the vehicle trim panel facing surface 30 has the same width as the footrest surface 32 as measured in the vehicle widthwise direction L1. However, it will be apparent to those skilled in the vehicle manufacturing field from this disclosure that the impact deflection member 22 can have a variety of surfaces, shapes, configurations and angles of different sizes and dimensions to accommodate different vehicles, as needed and/or desired.

Referring now primarily to FIGS. 5 to 10, the first portion 24 of the impact deflection member 22 will now be discussed. As shown, the first portion 24 is configured to be disposed outboard of the vehicle trim panel 20. In the illustrated embodiment, the first portion 24 comprises preferably thirty percent of the impact deflection member 22. In other words, at least thirty percent of the impact deflection member 22 is disposed outboard of the vehicle trim panel 20 to help ensure a secure fit of the impact deflection member 22 in the outboard area. Further, the first portion 24 comprises less than fifty percent of the total volume of the vehicle footrest impact deflection member. In particular, the first portion 24 is sized and dimensioned to be disposed outboard of the footrest area 12 at a vehicle outboard area 38. In the other words, the first portion 24 is at least partially not visible from inside of the vehicle 10 when the vehicle trim panel 20 is installed. Thus, the first portion 24 includes angles and surfaces having shapes and dimensions that correspond to the shapes and dimensions of the vehicle outboard area 38. It will be apparent to those in the vehicle field from this disclosure that the first portion 24 can be sized and dimensioned to accommodate different vehicles having different types of dash panels, as needed and/or desired. Further, the first portion 24 is at least partially disposed laterally between the vehicle pillar 18 and the vehicle trim panel 20. More specifically, the first portion 24 is disposed underneath the vehicle trim panel 20 when the impact deflection member 22 and the vehicle trim panel 20 are installed on the vehicle 10.

Figure 5:
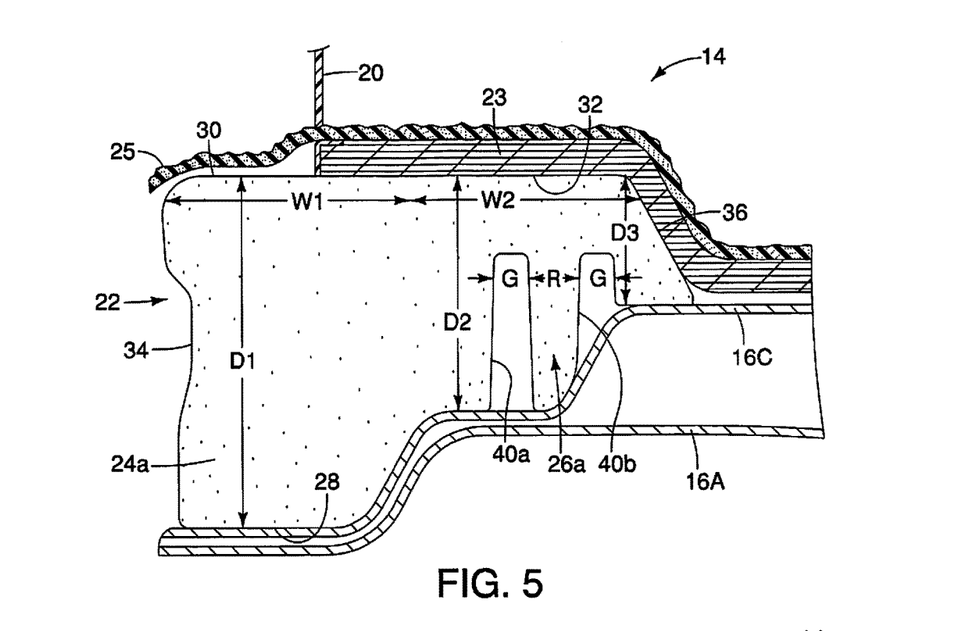
FIG. 5 is a cross-sectional view of a portion of the vehicle structure as seen along section line 5-5 of FIG. 4.
Figure 6:
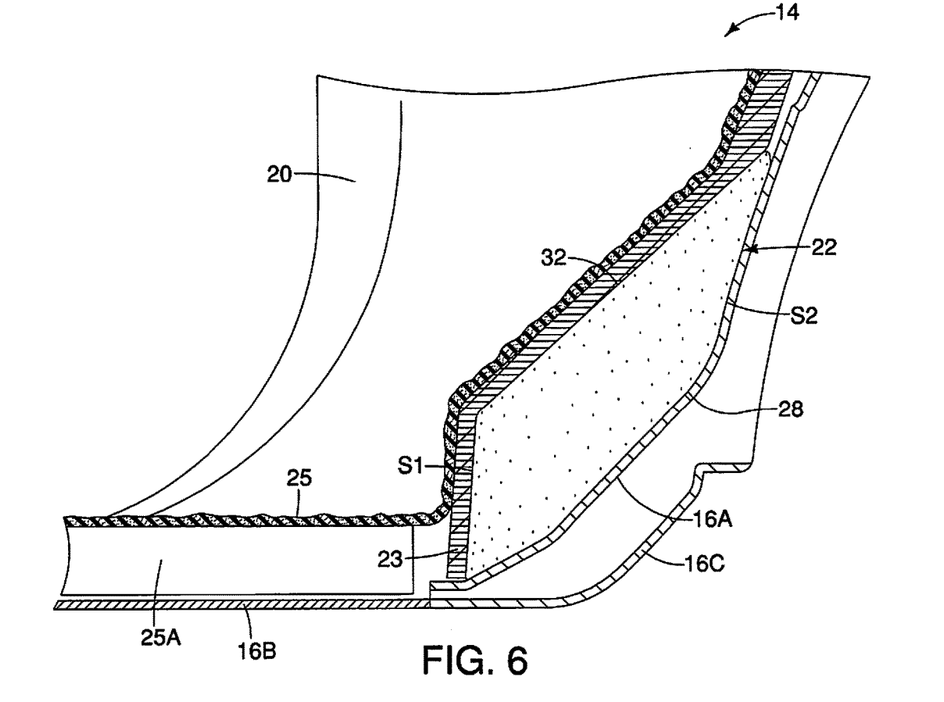
FIG. 6 is a cross-sectional view of a portion of the vehicle structure as seen along section line 6-6 of FIG. 4.

As best seen in FIG. 5, the first portion 24 includes a non-collapsible part 24a having the first overall density. The non-collapsible part 24a can be considered a less collapsible part of the impact deflection member 22. In particular, the non-collapsible part 24a is defined by an area that is disposed underneath the vehicle trim panel 20 in which the foam lacks any voids, as will be further discussed below. Therefore, due to the first overall density, the non-collapsible part 24a is configured to not collapse during a collision and to substantially retain overall dimensions (i.e., that is the non-collapsible part 24a may be deformed or compressed no more than 20 millimeters when experiencing an impact load of 2000 Newtons). As shown in FIG. 5, the non-collapsible part 24a has a first dimension D as measured from the vehicle body panel facing surface 28 to the vehicle trim panel facing surface 30. Thus, as shown, the non-collapsible part 24a includes the vehicle trim panel facing surface 30. In the illustrated embodiment, the first dimension D1 is a maximum dimension of the first portion 24 as measured from the vehicle body panel facing surface 28 to the vehicle trim panel facing surface 30. Preferably, the first (maximum) dimension D1 is measured from the vehicle body panel facing surface 28 to the vehicle trim panel facing surface 30. In other words, the first (maximum) dimension D1 of the impact deflection member 22 is measured from the vehicle body panel facing surface 28 to the vehicle trim panel facing surface 30.

Referring to FIGS. 5, 10 and 11, the second portion 26 of the impact deflection member 22 will now be discussed. As shown, the second portion 26 extends inboard from the first portion 24 when the impact deflection member 22 is installed on the vehicle 10. The second portion 26 includes angles and surfaces having shapes and dimensions that correspond to the shapes and dimensions of the dash panel 16A. It will be apparent to those in the vehicle field from this disclosure that the second portion 26 can be sized and dimensioned to accommodate different vehicles having different types of dash panels, as needed and/or desired. As shown, in the illustrated embodiment, the second portion 26 includes the footrest surface 32. Therefore, the second portion 26 is configured to support the driver's foot during use.

As best seen in FIG. 5, the second portion 26 includes a collapsible part 26a having the second overall density that is less dense than the first overall density of the non-collapsible part 24a. The collapsible part 26a can be considered a more collapsible part of the impact deflection member 22. Therefore, due to the second overall density, the collapsible part 26a is configured to collapse (i.e., deformed or compressed more than ten percent of its overall dimensions) during a collision. In the illustrated embodiment, the second overall density of the collapsible part 26a is formed by the impact deflection member 22 including a first void 40a and a second void 40b that are separated by a rib 41. In other words, the collapsible part 26a includes at least one void (the first and second voids 40a and 40b) that causes the second overall density to be less dense than the first overall density. However, in the illustrated embodiment, the at least one void includes a plurality of voids (e.g., the first and second voids 40a and 40b). Of course, it will be apparent to those skilled in the vehicle field from this disclosure that the collapsible part 26a can include a variety of number of voids so that the second overall density is less than the first overall density, and collapses in the desired manner to guide the driver's foot away from the vehicle trim panel 20. In the illustrated embodiment, a range of the second overall density is approximately 30 to 35 grams per liter. More preferably, the second overall density is approximately 33 grams per liter.

Preferably, in the illustrated embodiment, the impact deflection member 22 is a molded member to include the voids 40a and 40b. As shown, in the illustrated embodiment, the voids 40a and 40b are disposed on the vehicle body panel facing surface 28. In other words, the voids 40a and 40b are recesses having openings disposed on the vehicle body panel facing surface 28. However, it will be apparent to those skilled in the vehicle field from this disclosure that the voids 40a and 40b can have openings disposed on the inboard facing surface 36 or any of the side surfaces S1 and S2 of the second portion 26. Alternatively, it will be apparent to the vehicle field from this disclosure that the voids 40a and 40b can be enclosed areas disposed in a variety of patterns or configuration in the collapsible part 26a of the second portion 26.

As best seen in FIGS. 9 and 10, the voids 40a and 40b are illustrated as being elongated channels having longitudinal lengths extending in a vehicle longitudinal direction L2. As shown, the first and second voids 40a and 40b are disposed sequentially in the vehicle widthwise direction L1. In other words, the plurality of voids 40a and 40b extend in the vehicle widthwise direction L1. In the illustrated embodiment, as seen in FIG. 5, the voids 40a and 40 each preferably have a width G ranging from 10 to fifteen millimeters. More preferably, the width G of the voids 40a and 40b is approximately 12.5 millimeters. It will be apparent to those in the vehicle field from this disclosure that the first and second voids 40a and 40b can have the same longitudinal length and width as well as different lengths and widths as needed and/or desired.

While the voids 40a and 40b are illustrated as being the elongated channels in the illustrated embodiment, it will be apparent to those skilled in the vehicle field from this disclosure that the voids 40a and 40b can have different sizes and dimensions, as needed and/or desired. In particular, the voids 40a and 40b can be modified to have different sizes, shapes and dimensions to modify the density of the second overall density. Also, the second overall density can be modified by increasing or decreasing the number of voids in the second portion 26.

In the illustrated embodiment, the collapsible part 26a includes the rib 41 that is configured as a crush rib. Therefore, the rib 41 is configured to deform (crush) due to a rearward displacement of the dash panel 16A and vehicle pillar 18 during a vehicle off-center test when the driver's foot is on the impact deflection member 22. In the illustrated embodiment, the rib 41 preferably has a width R ranging from 8 to 13 millimeters. More specifically, the width R of the rib 41 can be approximately 11 millimeters. Therefore, the width R of the rib 41 is can be less than the width G of the first and second voids 40a and 40b. More specifically, a range of a ratio of the width G of the first and second voids 40a and 40b to the width R of the rib 41 is approximately 1.1 to 1.3. While the illustrated embodiment shows a single rib 41 separating the first and second voids 40a and 40b, it will be apparent to those skilled in the vehicle field from this disclosure that the collapsible part 26a can include a plurality of ribs separating additional numbers of voids, as needed and/or desired.

As shown in FIG. 5, the collapsible portion has a second dimension D2 as measured from the vehicle body panel facing surface 28 to the footrest surface 32. The second dimension D2 is less than the first dimension D1. Further, in the illustrated embodiment, the collapsible part 26a of the first portion 24 includes a third dimension D3 as measured from the vehicle body panel facing surface 28 to the footrest surface 32. The third dimension D3 extends inboard of the second dimension D2 and is less than the second dimension D2. Therefore, the impact deflection member 22 in the illustrated embodiment has a gradually decreasing dimension as measured between the vehicle body panel facing surface 28 and the footrest surface 32 towards the inboard direction.

Figure 12:
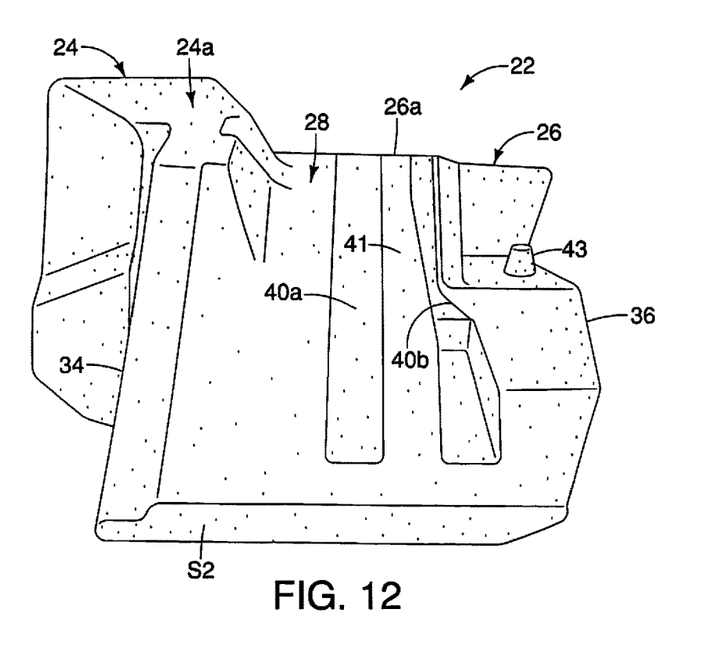
FIG. 12 is a second perspective view of the vehicle impact deflection member illustrated FIG. 11 showing a vehicle panel facing surface as viewed from a front side of the vehicle impact deflection member.
Figure 13:
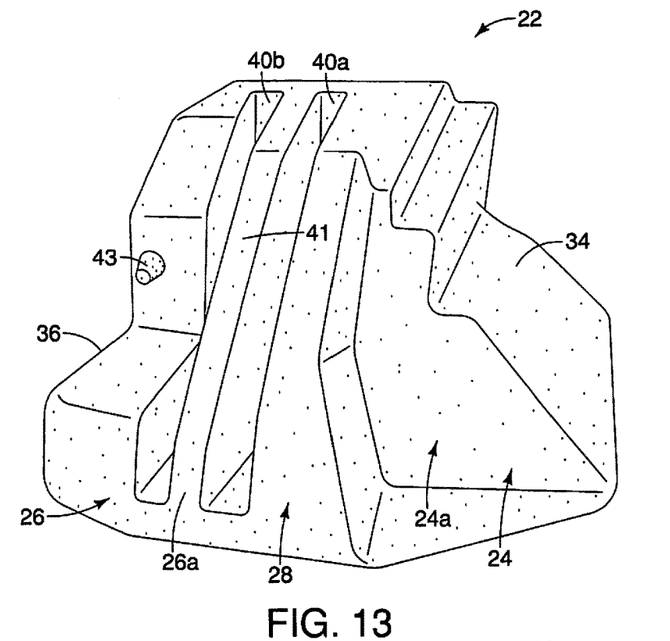
FIG. 13 is a third perspective view of the vehicle impact deflection member illustrated in FIGS. 11 and 12 showing the vehicle panel facing surface as viewed from a rear side of the vehicle impact deflection member.

As best seen in FIGS. 12 and 13, the impact deflection member 22 includes at least one locating pin 43 that is configured to engage a receiving hole of the dash panel 16A. In the illustrated embodiment, the locating pin 43 is disposed on the vehicle panel facing surface 28, and is part of the second portion 26. It will be apparent to those skilled in the vehicle field that the impact deflection member 22 can include additional locating pins on the inboard facing surface 36 or the side surface S2. In the illustrated embodiment, the locating pin 43 has a longitudinal length of approximately 8 to 13 millimeters. For example, in the illustrated embodiment, the locating pin 43 has a longitudinal length of approximately 10 millimeters.

Figure 14:
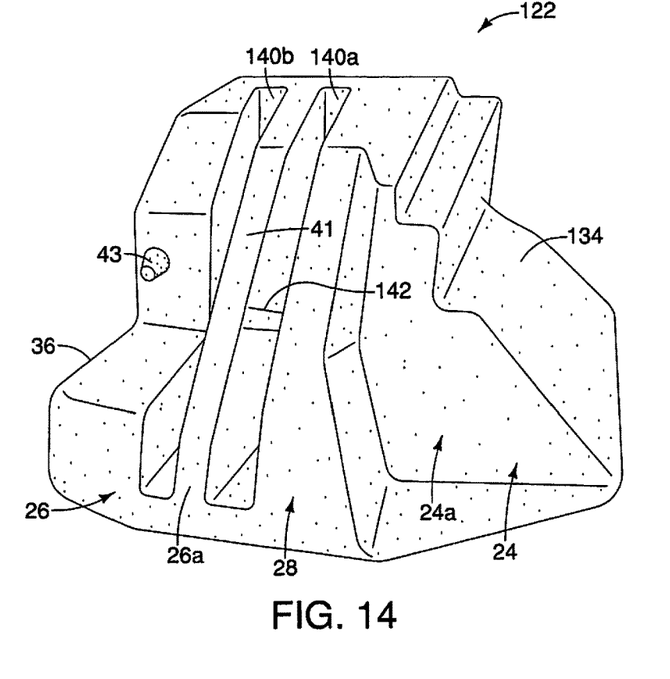
FIG. 14 is a perspective view, similar to FIG. 13, of a modified vehicle impact deflection member showing a vehicle panel facing surface as viewed from a rear side of the modified vehicle impact deflection member.

Referring now to FIG. 14, a modified vehicle footrest impact deflection member 22 that can be used with the vehicle 10 is illustrated (hereinafter "the modified impact deflection member 122"). The modified impact deflection member 122 is identical to the impact deflection member 22 except that the modified impact deflection member 122 includes at least one modified void 140a. Therefore, for simplicity, all corresponding structures that are identical to the vehicle footrest impact deflection member 22 will receive the same reference numerals. All corresponding modified portions will receive the same reference numerals but increased by 100.

The modified impact deflection member 122 includes the modified void 140a and a void 40b that are separated by webbing 142. In the illustrated embodiment, the webbing 142 extend laterally in the vehicle widthwise direction L1 when the modified impact deflection member 122 is installed onto the vehicle 10. It will be apparent to those skilled in the vehicle field from this disclosure that the modified void can include a varied number of webbing 142 having different sizes and configurations. Thus, as seen in FIG. 11, the plurality of voids 140a and 40b extend in the vehicle longitudinal direction L2 when installed onto the vehicle 10.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," or "member" when used in the singular can have the dual meaning of a single part or a plurality of parts. Also, as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle footrest impact deflection member. Accordingly, these terms, as utilized to describe the present invention should be interpreted relative to a vehicle equipped with the vehicle footrest impact deflection member.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle footrest impact deflection member comprising:
    a first portion configured to be disposed outboard of a vehicle trim panel, the first portion including a less collapsible part having a first overall density; and
    a second portion extending inboard from the first portion, the second portion including a more collapsible part having a second overall density that is less dense than the first overall density of the less collapsible part, the less collapsible part including an outboard facing surface that is configured to contact a vehicle pillar.

2. The vehicle footrest impact deflection member according to claim 1, wherein
    the more collapsible part includes at least one void that causes the second overall density to be less dense than the first overall density.

3. The vehicle footrest impact deflection member according to claim 2, wherein
    the at least one void is a recess having an opening disposed on a vehicle body panel facing surface.

4. The vehicle footrest impact deflection member according to claim 2, wherein
    the more collapsible part includes at least one crush rib.

5. The vehicle footrest impact deflection member according to claim 1, wherein
    the less collapsible portion has a first dimension as measured from a vehicle body panel facing surface to a vehicle trim panel facing surface, the more collapsible portion having a second dimension as measured from the vehicle body panel facing surface to a footrest surface, the second dimension being less than the first dimension.

6. The vehicle footrest impact deflection member according to claim 2, wherein
    the at least one void includes a plurality of voids, the plurality of voids extending in a vehicle widthwise direction.

7. The vehicle footrest impact deflection member according to claim 2, wherein
    the at least one void includes a plurality of voids, the plurality of voids extending in a vehicle longitudinal direction.

8. The vehicle footrest impact deflection member according to claim 1, wherein
    the first and second portions are a one-piece integral member.

9. The vehicle footrest impact deflection member according to claim 1, wherein
    the first and second portions are made of foam.

10. The vehicle footrest impact deflection member according to claim 5, wherein
    the vehicle trim panel facing surface is substantially coplanar with the footrest surface.

11. The vehicle footrest impact deflection member according to claim 1, wherein
    the first portion comprises less than fifty percent of the total volume of the vehicle footrest impact deflection member.

12. A vehicle structure comprising the vehicle footrest impact deflection member of claim 1, the vehicle structure further comprising:
    a vehicle body panel; and
    the vehicle trim panel.

13. The vehicle structure according to claim 12, wherein the vehicle trim panel is disposed over the first portion of the vehicle footrest impact deflection member having the first overall density.

14. The vehicle structure according to claim 12, wherein the vehicle footrest impact deflection member is disposed outboard of a vehicle pedal when the footrest impact deflection member is installed onto the vehicle body panel.

15. The vehicle structure according to claim 13, further comprising
a vehicle pillar, the vehicle trim panel being disposed over the vehicle pillar of the vehicle body panel.

* * * * *